Patented Jan. 10, 1933

1,894,191

UNITED STATES PATENT OFFICE

PAUL NAWIASKY AND ARTUR KRAUSE, OF LUDWIGSHAFEN-ON-THE-RHINE, GERMANY, ASSIGNORS TO GENERAL ANILINE WORKS, INC., OF NEW YORK, N. Y., A CORPORATION OF DELAWARE

DYESTUFF OF THE ANTHRAQUINONE SERIES

No Drawing. Application filed April 18, 1932, Serial No. 606,067, and in Germany December 16, 1929.

The present invention relates to a dyestuff of the anthraquinone series suitable for dyeing cellulose esters and ethers.

In the copending application Ser. No. 501,463 we have described new dyestuffs of the anthraquinone series suitable for dyeing cellulose esters and ethers which dyestuffs are carboxylic acid amides of aminoanthraquinones containing a hydroxy group or a further amino group and in which the hydrogen atoms of the amino groups may be replaced by alkyl or aryl radicles.

We have now found that the 1-amino-4-methyl-aminoanthraquinone-2-carboxylic acid amide is a particularly valuable dyestuff for dyeing cellulose esters and ethers, especially acetate silk, in view of the very strong greenish blue shades of good fastness properties obtained therewith.

The said dyestuff may be prepared by saponifying 1-amino-4-methyl-aminoanthraquinone-2-nitrile by means of sulphuric acid. Another way for the preparation of the said dyestuff is the following: 1-amino-4-para-toluene-sulphaminoanthraquinone-2-carboxylic acid is converted into the corresponding acid chloride from which the corresponding acid amide is prepared. The hydrogen atom of the sulphamino group in the 4-position is then substituted by a methyl group whereupon the para-toluene sulphonic radical is removed by saponification.

The following example will further illustrate the nature of the present invention but the invention is not limited to this example. The parts are by weight.

Example 10 parts of 1-amino-4-methylaminoanthraquinone-2-nitrile (obtainable by acting on 1-amino-4-methylaminoanthraquinone-2-sulphonic acid with an aqueous solution of potassium cyanide) are dissolved, while stirring, in 200 parts of 96 per cent sulphuric acid. The solution is warmed to 40° C. and kept at this temperature until saponification to the carboxylic acid amide is complete which takes about 4 to 5 hours. The reaction mixture is then poured into water, the precipitated dyestuff filtered off and washed until neutral.

The 1-amino-4-methylaminoanthraquinone-2-carboxylic acid amide thus obtained dyes acetate silk very strong greenish blue shades of good fastness properties.

What we claim is:

1. The dyestuff suitable for dyeing cellulose esters and ethers corresponding to the formula:

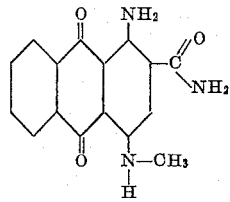

dyeing acetate silk greenish blue shades.

In testimony whereof we have hereunto set our hands.

PAUL NAWIASKY.
ARTUR KRAUSE.